United States Patent Office 3,532,765
Patented Oct. 6, 1970

3,532,765
OLEFIN OLIGOMERIZATION
Kenneth W. Barnett, San Leandro, and John H. Raley, Walnut Creek, Calif., assignors to Shell Oil Company, New York, N.Y., a corporation of Delaware
No Drawing. Filed Apr. 9, 1968, Ser. No. 719,846
Int. Cl. C07c 3/10
U.S. Cl. 260—683.15                        5 Claims

ABSTRACT OF THE DISCLOSURE

An improved ethylene oligomerization process employs a catalyst compostion produced by contacting ($\pi$-cyclopentenyl)cyclopentadienylnickel and an inorganic oxide support.

BACKGROUND OF THE INVENTION

A variety of oligomerization catalysts, both homogeneous and heterogeneous, has been employed to convert, i.e., oligomerize, lower olefins to olefinic products of higher molecular weight, e.g., to dimer, trimer, tetramer or the like. However, the scope of operable olefinic reactants as well as the character and relative proportions of the product mixture components are greatly dependent upon the particular catalyst employed. One homogeneous process is that of Tsutsui et al., J. Polymer Sci., A–1, 5, 681 (1967), which employs nickelocene, i.e., bis(cyclopentadienyl)nickel, as the catalyst. This process, however, is useful only for the conversion of ethylene, and higher olefinic reactants are not suitably employed. A related process of Walker et al., U.S. 3,134,824, issued May 26, 1964, employs nickelocene supported on silica-alumina as catalyst. This composition, however, is relatively inactive at moderate temperatures, e.g., at or below 100° C., although the oligomerization product mixture does contain relatively large proportions of desirable trimer and tetramer products in contrast to the process of Tsutsui et al. which yields essentially only olefin dimer product. It would be of advantage, however, to obtain a product mixture of equivalent or more desirable composition by a process conducted at moderate reaction temperatures.

SUMMARY OF THE INVENTION

It has now been found that an improved process of oligomerizing ethylene is obtained through the use of a heterogeneous catalyst composition produced by contacting a partially hydrogenated nickelocene, ($\pi$-cyclopentenyl)cyclopentadienylnickel, and a solid, inorganic oxide support. The process is characterized by an ethylene conversion at moderate temperatures to a product mixture of relatively high proportions of trimer and tetramer products which are predominately linear in character.

DESCRIPTION OF PREFERRED EMBODIMENTS

The process of the invention contemplates, broadly speaking, intimately contacting ethylene in a liquid reaction environment with a catalyst composition produced by contactinng ($\pi$-cyclopentenyl)cyclopentadienylnickel and an inert inorganic oxide support in non-gaseous phase. The nickel-containing catalyst composition precursor is a known compound, being disclosed by Wollensak, U.S. 3,088,960, issued May 7, 1963.

The catalyst support comprises a normally solid inorganic oxide support, preferably consisting essentially of one or more metal oxides, which contains a major proportion of at least one metal oxide component selected from silica and alumina. Such materials are commonly known as refractory oxides and include synthetic materials as well as acid-treated clays or the crystalline aluminosilicates known in the art as molecular sieves. Synthetic refractory oxides are preferred over naturally occurring materials or molecular sieves and exemplary synthetic refractoryoxides include silica, alumina, silica-alumina, silica-magnesia, tungsten oxide-silica-alumina, boria-alumina, silica-alumina-zirconia, molybdenum oxide-silica-alumina and silica-titania-zirconia. Preferred refractory oxide supports are siliceous refractory oxides, that is, refractory oxides containing silica as the major component, and particularly preferred as the siliceous refractory oxide is silica-alumina.

No special pretreatment of the catalyst support prior to contact with the nickel compound is required, but better results are obtained if the support has been calcined at temperatures from about 450° C. to about 600° C. for a period of from about 6 to about 24 hours prior to formation of the catalyst composition.

The catalyst composition is produced by contacting the inorganic oxide support and the ($\pi$-cyclopentenyl)-cyclopentadienylnickel. Although the precise method of interaction between the support and the nickel compound is not known with certainty, it is considered likely that the support serves at least in part to chemically alter the ($\pi$-cyclopentenyl)cyclopentadienylnickel in some manner as unchanged nickel compound is not entirely recovered by washing the catalyst composition with polar solvents. Although other conventional contacting techniques are on occasion useful, the preferred method of contacting the catalyst support and the ($\pi$-cyclopentenyl) cyclopentadienylnickel is to intimately contact the support with a solution of the nickel compound in a liquid hydrocarbon reaction diluent. Illustrative of such diluents are hydrocarbons free from aliphatic unsaturation such as hexane, octane, decane, dodecane, cyclohexane, decahydronaphthalene, benzene, toluene and xylene. The amount of nickel compound to be employed in contacting the catalyst support is not critical so long as sufficient nickel is introduced onto the support to allow adequate ethylene/catalyst contact during the ethylene oligomerization process in which the catalyst composition is employed. Amounts of ($\pi$-cyclopentenyl)cyclopentadienylnickel to be utilized in contacting the catalyst support which are from about 1% by weight to about 10% by weight based on the catalyst support are satisfactory with amounts from about 3% by weight to about 8% by weight on the same basis being preferred.

The catalyst composition components are contacted at any convenient temperature with the range from about 20° C. to about 150° C. being satisfactory. The pressure to be employed is not critical provided that the pressure is sufficient to maintain the reaction mixture substantially in a non-gaseous phase. Pressures from about 1 atmosphere to about 50 atmospheres are satisfactory.

Subsequent to the contacting of the catalyst support and the ($\pi$-cyclopentenyl)cyclopentadienylnickel, the resulting catalyst composition is separated from the diluent, if desired, by conventional techniques such as filtration and decantation. In most instances, however, it is more convenient to directly employ the mixture of diluent and catalyst composition in the ethylene oligomerization process wherein the presence of a reaction diluent is also desired.

The ethylene oligomerization process is conducted by contacting, in non-gaseous phase, the ethylene, the catalyst composition and a reaction diluent which is the same as or is similar to the diluent utilized in the production of the catalyst composition. In certain modifications of the process, a portion of the oligomer product suitably serves as at least a portion of the reaction diluent and less added diluent is required. In most instances, however, added diluent is used and amounts up to about 5 moles of diluent per mole of ethylene are satisfactory. The ethylene oligomerization is conducted in an inert reaction environment so that the reaction conditions are substantially anhydrous and substantially oxygen-free.

The precise method of establishing ethylene/catalyst contact is not critical. In one modifications, the catalyst composition and the diluent are charged to an autoclave or similar pressure reactor, the ethylene feed is introduced, and the reaction mixture is maintained with agitation at reaction temperature and pressure for the desired reaction period. Another modification comprises passing, in a continuous manner, the ethylene feed in liquid-phase solution in the reaction diluent through a reaction zone in which the catalyst composition is maintained. By any modification, the oligomerization process is conducted at moderate temperatures and pressures. Suitable reaction temperatures vary from about 20° C. to about 200° C., but preferably from about 20° C. to about 100° C. The reaction is conducted at or above atmospheric pressure. The precise pressure is not critical, so long as the reaction mixture is maintained substantially in a non-gaseous phase. Typical pressures vary from about 1 atmosphere to about 80 atmospheres with the range from about 2 atmospheres to about 35 atmospheres being preferred.

At the conclusion of reaction, the product mixture is separated and the oligomer products are recovered by conventional methods such as fractional distillation, selective extraction, adsorption and the like. The reaction diluent, the catalyst composition and any unreacted olefin feed are recycled for further utilization.

The ethylene oligomer products are materials of established utility and many are chemicals of commerce. The oligomer products, which remain ethylenic in character, are converted by conventional "oxo" processes to aldehydes which are hydrogenated with conventional catalysts to the corresponding alcohols. Alternatively, the product olefins are converted to secondary and tertiary alcohols as by sulfuric acid-catalyzed hydration. The $C_{12}$–$C_{20}$ alcohols thereby produced are ethoxylated as by reaction with ethylene oxide in the presence of a basic catalyst, e.g., sodium hydroxide, to form conventional detergents and the lower molecular weight alcohols are esterified by reaction with polybasic acids, e.g., phthalic acid, to form plasticizers for polyvinyl chloride.

To further illustrate the improved process of the invention and the novel catalyst composition therefor, the following examples are provided. It should be understood that the details thereof are not to be regarded as limitations as they may be varied as will be understood by one skilled in this art.

Example I (A) A catalyst composition was produced by charging to an 84 ml. autoclave 2 grams of a commercial silica-alumina (25% alumina), 20 ml. of heptane and 0.1 g. of ($\pi$-cyclopentenyl)cyclopentadienylnickel and maintaining the mixture at 100° C. for one hour. The reactor was then charged with 13.8 g. of ethylene and maintained at 50–75° C. for one hour. The maximum pressure was 400 p.s.i. The product mixture was then removed and analyzed by gas-liquid chromatographic techniques. The results of this run are reported in Table I as Run A.

(B) The same procedure was employed to produce a catalyst composition by contacting nickelocene with the silica-alumina. This catalyst was also contacted with ethylene in heptane at an elevated temperature to afford the results reported in Table I as Run B.

TABLE I

|  | Run A | Run B |
|---|---|---|
| Total, ethylene, g | 13.8 | 10.9 |
| Conditions: |  |  |
| Temperature, °C | 50–75 | 25–75 |
| Time, hr | 1.0 | 1.0 |
| Pressure, p.s.i.g | 400 | 350 |
| Reaction rate, g. oligomer/g. catalyst/hr | 5.8 | 0 |
| Olefin conversion, percent | 84 | 0 |
| Selectivity, percent: |  |  |
| $C_4$ | 58 |  |
| $C_6$ | 25 |  |
| $C_8$ | 10 |  |
| $C_{10}$ | 4 |  |
| $C_{12}$ | 2 |  |
| Linearity of olefin product, percent: |  |  |
| $C_6$ | 81 |  |
| $C_8$ | 63 |  |
| $C_{10}$ | 48 |  |

Example II

When a catalyst composition similar to that of Example I, part A, was employed to attempt to oligomerize 1-butene, only a 4% conversion of the butene to an exclusively dimer oligomer product was observed when the butene was contacted with the catalyst composition for 1 hour at 70° C. and a maximum pressure of 50 p.s.i.

Example III

The procedure of Example I, part A, was followed except that the catalyst support was tungstic oxide-alumina (10% tungstic oxide). The catalyst composition and reaction diluent were contacted with 8.9 g. ethylene and maintained at 110° C. for 2.5 hours with a maximum pressure of 500 p.s.i. The conversion to oligomer was 73% with the selectivities and linearities given in Table II.

TABLE II

| Selectivity: | Percent |
|---|---|
| $C_4$ | 41 |
| $C_6$ | 23 |
| $C_8$ | 13 |
| $C_{10}$ | 10 |
| $C_{12}$ | 5 |
| Linearity: |  |
| $C_6$ | 86 |
| $C_8$ | 68 |
| $C_{10}$ | 58 |

We claim as our invention:

1. The process of oligomerizing ethylene by intimately contacting, in non-gaseous phase at a temperature from about 20° C. to about 200° C., ethylene and a catalyst composition produced by intimately contacting (a) an inert, inorganic oxide catalyst support, and (b) from about 1% by weight to about 10% by weight based on catalyst support of ($\pi$-cyclopentenyl)cyclopentadienylnickel, in an inert liquid reaction diluent at a temperature from about 20° C. to about 150° C.

2. The process of claim 1 wherein the catalyst support is a siliceous refractory oxide.

3. The process of claim 2 wherein the siliceous refractory oxide is silica-alumina and the temperature of said contacting of the ethylene and catalyst composition is from about 20° C. to about 100° C.

4. The process of claim 1 wherein the catalyst support contains a major proportion of alumina.

5. The process of claim 4 wherein the catalyst support is tungsten oxide-alumina.

References Cited

UNITED STATES PATENTS

| | | | |
|---|---|---|---|
| 3,134,824 | 5/1964 | Walker et al. | 260—683.15 |
| 3,163,682 | 12/1964 | Walker et al. | 252—431 X |
| 3,424,816 | 1/1969 | McClure et al. | 260—683.15 |
| 3,459,826 | 8/1969 | Barnett et al. | 260—683.15 |

PAUL M. COUGHLAN, Jr., Primary Examiner

U.S. Cl. X.R.

252—430